(12) United States Patent
Kapp et al.

(10) Patent No.: US 9,188,224 B2
(45) Date of Patent: Nov. 17, 2015

(54) GEAR SHIFT ARRANGEMENT WITH PARKING BLOCK AND METHOD FOR ITS ACTIVATION

(71) Applicant: GETRAG Getriebe- und Zahnradfabrik Hermann Hagenmeyer GmbH & Cie KG, Untergruppenbach (DE)

(72) Inventors: Stefan Kapp, Walheim (DE); Georg Burgardt, Bretzfeld (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 83 days.

(21) Appl. No.: 14/075,694

(22) Filed: Nov. 8, 2013

(65) Prior Publication Data

US 2014/0138206 A1 May 22, 2014

(30) Foreign Application Priority Data

Nov. 16, 2012 (DE) .......................... 10 2012 022 635

(51) Int. Cl.
*F16H 63/34* (2006.01)
*F16H 63/30* (2006.01)
*F16H 63/48* (2006.01)

(52) U.S. Cl.
CPC .......... *F16H 63/3416* (2013.01); *F16H 63/304* (2013.01); *F16H 63/48* (2013.01); *F16H 2063/3089* (2013.01)

(58) Field of Classification Search
CPC ............ F16H 63/3425; F16H 63/3458; F16H 63/3466; F16H 63/3475; F16H 63/3483
USPC ....................................................... 192/219.5
See application file for complete search history.

(56) References Cited

U.S. PATENT DOCUMENTS

| | | | |
|---|---|---|---|
| 5,517,876 | A | 5/1996 | Genise et al. |
| 6,003,649 | A | 12/1999 | Fischer et al. |
| 6,220,109 | B1 | 4/2001 | Fischer et al. |
| 7,717,010 | B2 | 5/2010 | Bar et al. |
| 8,544,355 | B2 | 10/2013 | Burgardt et al. |

(Continued)

FOREIGN PATENT DOCUMENTS

| | | |
|---|---|---|
| DE | 19713423 A1 | 11/1997 |
| DE | 69516766 T2 | 12/2000 |
| DE | 202008001760 U1 | 5/2008 |
| DE | 102012007061 A1 | 10/2013 |

(Continued)

*Primary Examiner* — Richard Lorence
(74) *Attorney, Agent, or Firm* — Reising Ethington P.C.

(57) ABSTRACT

A gear shift arrangement for a motor vehicle gear mechanism comprises at least one clutch arrangement by means of which a gear of the gear mechanism can be engaged and disengaged. An actuator arrangement is coupled with the clutch arrangement via a first force transmission device. A parking block arrangement is coupled with the actuator arrangement via a second force transmission device. The actuator arrangement can be moved into a parking block position in which the parking block arrangement is activated. The actuator arrangement is configured to engage the gear on its travel to the parking block position and/or in the parking block position via the first force transmission device. The first force transmission device has a decoupling device which is configured to move or to let move the actuator arrangement into the parking block position even when the clutch arrangement is blocked.

18 Claims, 4 Drawing Sheets

(56) References Cited

U.S. PATENT DOCUMENTS

2007/0272511 A1* 11/2007 Saitoh .................... 192/219.5
2013/0256089 A1 10/2013 Burgardt et al.

FOREIGN PATENT DOCUMENTS

| EP | 1865237 A1 | 12/2007 |
| WO | WO2005073602 A1 | 8/2005 |

* cited by examiner

GEAR SHIFT ARRANGEMENT WITH PARKING BLOCK AND METHOD FOR ITS ACTIVATION

CROSS-REFERENCE TO RELATED APPLICATIONS

This application claims priority from German patent application 10 2012 022 635.7, filed on Nov. 16, 2012. The entire contents of this priority application is incorporated herein by reference.

BACKGROUND

The present invention concerns a gear shift arrangement for a motor vehicle gear mechanism with at least one clutch arrangement, by means of which a gear of the clutch gear mechanism can be engaged and disengaged, with an actuator arrangement which is coupled with the clutch arrangement via a first force transmission device, and with a parking block arrangement which is coupled with the actuator arrangement via a second force transmission device, wherein the actuator arrangement can be moved into a parking block position in which the parking block arrangement is activated, wherein the actuator arrangement is configured to engage the gear on its travel to the parking block position and/or in the parking block position via the first force transmission device.

Furthermore the present invention concerns a method for activating a parking block arrangement by means of an actuator arrangement, in particular by means of a gear shift arrangement of the type described above.

In the field of motor vehicle gear mechanisms, it is known to use parking block arrangements to immobilise a motor vehicle. Such parking block arrangements are used in particular in automatic transmissions in which it is not always possible to engage a gear for immobilising the motor vehicle (such as for example automated gear mechanisms or double clutch gear mechanisms), or in which the gear mechanism is coupled with a drive motor via a hydrodynamic converter. In such automated gear mechanisms, a parking block arrangement is generally activated in that a gear selector lever is moved into position P. Previously it was conventional to couple the selector lever with a parking block arrangement mechanically. However, so-called "park-by-wire" systems are known in which the parking block arrangement is activated by means of an actuator arrangement.

Parking block arrangements of this type typically have a parking block cog which is firmly connected to a shaft associated with the output from the motor vehicle gear mechanism. Furthermore such parking block arrangements typically contain a parking block pawl which in the release position releases the parking block cog, and in a parking block position engages in a toothing of the parking block cog in order to immobilise the motor vehicle in this way. An example of such a parking block arrangement is disclosed in document DE 20 2008 001 760 U1.

Alternative parking block arrangements have draw key arrangements for moving a parking block pawl from a release position into a parking block position.

In the field of gear shift arrangements for motor vehicles, it is furthermore known to activate a clutch arrangement, such as for example a synchronous clutch, by means of an actuator arrangement. Such actuator arrangements can contain hydraulic actuators or electromechanical actuators. For the second case it is known for example to use so-called drum controllers which are driven by means of an electric motor. Drum controllers of this type contain a drum controller contour which engages in a carrier coupled to the clutch arrangement, in order for example to move a selector sleeve of a clutch between a neutral position and a gear position.

The earlier German application DE 10 2012 007 061, which constitutes a prior art according to §3 (2) German Patent Act, discloses a gear shift arrangement in which a drum controller is used to activate a clutch arrangement in the known manner, but furthermore it is also coupled with a parking block arrangement of the type described above via a constrained motion gear mechanism.

In this context it is an object of the invention to specify an improved gear shift arrangement and an improved method for activating a parking block arrangement, wherein the actuator arrangement can be constructed simply, and wherein activation of the parking block arrangement is possible with high security.

This object is achieved by the gear shift arrangement of the type cited initially in that a first force transmission device has a decoupling device which is configured to move or to let move the actuator arrangement into the parking block position even when the clutch arrangement is blocked.

SUMMARY

Furthermore the object above is achieved by a method for activating a parking block arrangement by means of an actuator arrangement, in particular by means of a gear shift arrangement of the type according to the invention, wherein the actuator arrangement is coupled with a clutch arrangement of a motor vehicle via a first force transmission device, wherein the actuator arrangement is coupled with the parking block arrangement via a second force transmission device, and wherein the first force transmission device has a decoupling device, with the steps: control of the actuator arrangement such that a first force is provided for moving the parking block arrangement into a parking block position, then detection of whether a blockade occurs on the travel into the parking block position, and control of the actuator arrangement such that a second force is provided which is greater than the first force and by means of which the decoupling device of the first force transmission device is activated if a blockade has occurred.

The gear shift arrangement according to the invention allows activation of both the clutch arrangement and the parking block arrangement by means of a single actuator. In this way the cost of the actuator mechanism can be reduced, since for example it is not necessary to provide a separate actuator for the parking block arrangement.

If the actuator arrangement is provided such that the parking block position is approached via a gear position, or a gear can be engaged while in the parking block position, a command for engaging the parking block according to the prior art cannot always be implemented since it can occur that engagement of the gear is not possible, for example because the clutch arrangement is blocked. This can occur when the vehicle has stopped, since it may occur that the toothings (for example on a clutch body and a selector sleeve), which must be intermeshed axially in order to engage the gear, stand relative to each other in such a rotary position that the engagement process is not possible and the clutch is consequently blocked.

With the decoupling device provided in the first force transmission device according to the invention, it is possible to decouple the engagement of the parking block arrangement and the engagement of the gear mechanically, such that the engagement of the parking block arrangement can be guaranteed despite the blocked clutch arrangement.

The decoupling device can be formed such that it can be activated by a specific force which exceeds the force normally required to engage a gear or engage the parking block.

Consequently in the method according to the invention it is provided that on detection of such a blockade, the actuator arrangement provides a greater force (second force) by means of which the decoupling device can be activated, in order in this way to allow the engagement or activation of the parking block arrangement even when a blockade has occurred, for example in the clutch arrangement.

Consequently a gear shift arrangement can be provided which allows low complexity and a high level of robustness. Furthermore the gear shift arrangement can be produced with little expenditure and at low cost.

Furthermore a high availability, ideally 100%, of the parking block arrangement is ensured. Also, because of the fully integrated solution, little space is required. The coupling of the P position of a shift lever in the vehicle cab with the gear shift arrangement can here fulfil the highest existing safety requirements (for example ASIL A).

The object is therefore completely achieved.

According to a particularly preferred embodiment, the decoupling device has a mechanical energy accumulator which is configured to store a force applied by the actuator arrangement for engaging the gear if the clutch arrangement is blocked.

The difference between the first and second force on implementation of the method according to the invention can here correspond to the energy stored mechanically.

According to a particularly preferred embodiment, the decoupling device has a spring.

Via a spring, an "idle" travel in the first force transmission device can be created such that the actuator arrangement can be moved further into the parking block position even on a blockade, wherein in this case the spring is tensioned.

The spring can be installed with a slight pretension to prevent rattle noise.

On provision of a mechanical energy accumulator such as a spring, it is preferred if the energy accumulator creates a pretension force between the actuator arrangement and the clutch arrangement which is greater than the mean shift force to be applied for engaging the gear.

In this embodiment, in normal shift processes in which the clutch device is not blocked, the spring is not compressed or the mechanical energy accumulator is not "charged".

Thus normal gear changes can take place as in a conventional motor vehicle gear mechanism. This pretension force must be only overcome if a blockade occurs in the gear shift mechanism and the parking block position is to be engaged.

Alternatively it is also possible to set the pretension force lower than the shift force, wherein then a certain compression of the spring occurs on each shift process. This can in some cases prevent scraping in the clutch arrangement.

According to a generally preferred embodiment, the decoupling device is arranged between an actuator element of the actuator arrangement and a selector element of the clutch arrangement.

Alternatively however it is also conceivable to integrate the decoupling device in the actuator element.

Furthermore it is advantageous here if the decoupling device is arranged between the selector element and a selector rod which is connected by form fit with the actuator element.

Whereas in conventional clutch arrangements, selector elements such as selector forks are rigidly attached to a selector rod, the decoupling device between the actuator element and the selector element ensures that the selector element can remain in a blockade position even when the actuator arrangement is moved into the parking block position.

Furthermore, generally it is advantageous if the clutch arrangement has a selector element and a selector rod, wherein the selector element is mounted moveably within limits on the selector rod.

Here it is advantageous if the selector element is coupled with the selector rod via a spring, wherein the spring constitutes a mechanical energy accumulator of a decoupling device.

In general however it is also possible to mount a carrier, by means of which the selector rod is activated, moveably on the actuator rod and where applicable couple this with the selector rod via a spring. In this case the selector element can be rigidly connected with the selector rod.

The actuator arrangement can be hydraulic or electromechanical.

It is particularly preferred if the actuator arrangement has a drum controller.

In this case it is particularly preferred if a carrier element of the first force transmission device engages in a switch contour of the drum controller and/or if the parking block arrangement is coupled with the drum controller via a constrained motion gear mechanism.

The carrier element can for example have a sliding pad which engages in a switch groove of the drum controller.

The constrained motion gear mechanism which forms the second force transmission device in this case can for example be a spur gear set, wherein a drive wheel for activating the parking block arrangement is coupled with a wheel which is rigidly connected to the drum controller.

Evidently the features described above and to be explained further below can be used not only in the combination given but also in other combinations, or alone, without leaving the scope of the present invention.

BRIEF DESCRIPTION OF THE SEVERAL VIEWS OF THE DRAWINGS

Exemplary embodiments of the invention are illustrated in the drawings and will be explained in more detail in the following description. In the drawings.

DETAILED DESCRIPTION OF PREFERRED EMBODIMENTS

Figure 1:
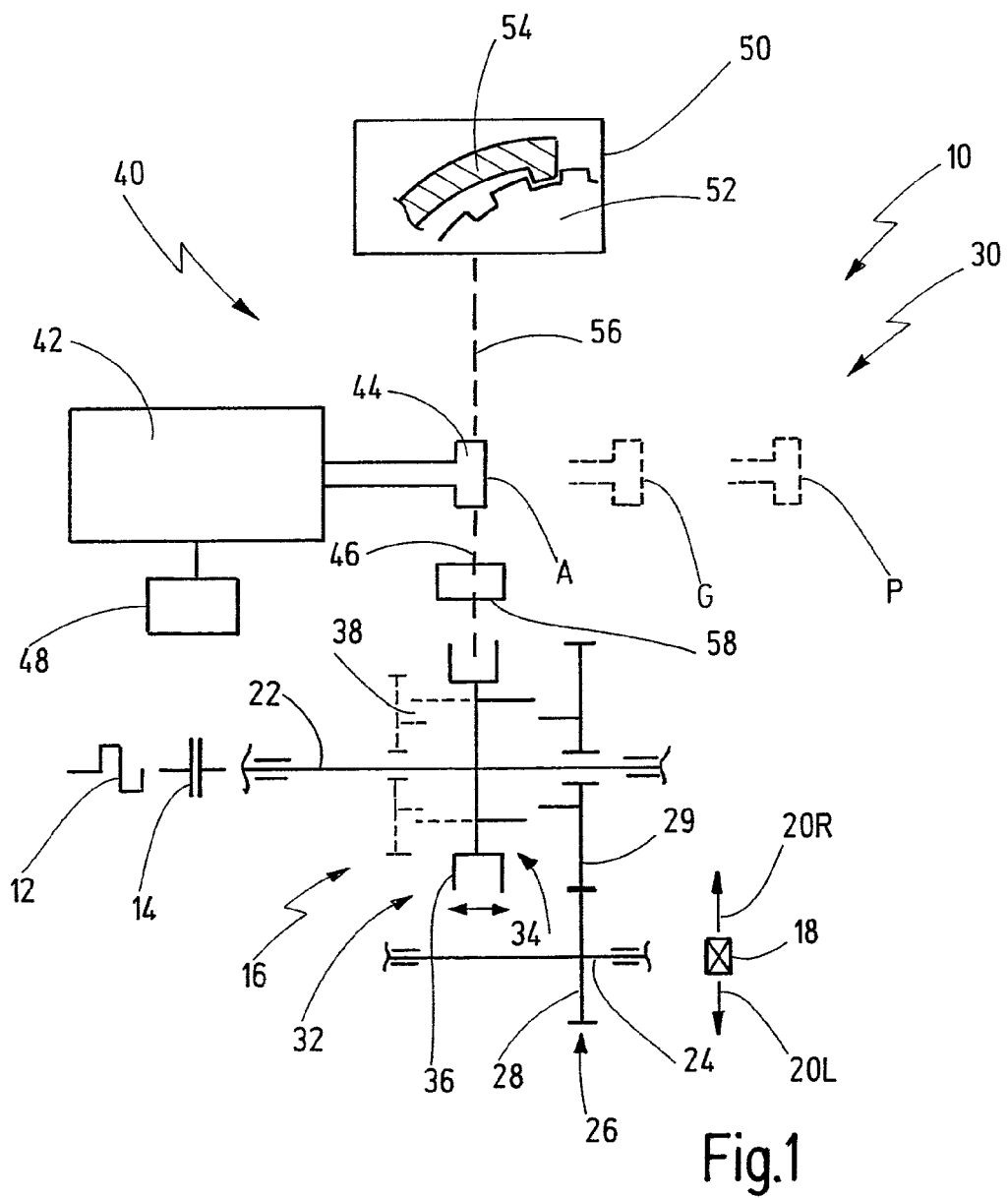
FIG. 1 is a diagrammatic depiction of a drive train for a motor vehicle with a motor vehicle gear mechanism which has a gear shift arrangement according to the invention.

FIG. 1 shows diagrammatically a drive train for a motor vehicle designated generally as 10. The drive train 10 contains a drive motor 12 such as an internal combustion engine, the output shaft of which is coupled with the input of a clutch arrangement 14. The clutch arrangement 14 can have a single clutch but can also have a double clutch arrangement. An output from the clutch arrangement 14 is connected to the input of a gear mechanism 16, which is preferably formed as a layshaft gear mechanism and has a multiplicity of forward gears and at least one reverse gear. The gear mechanism 16 can be a single gear mechanism, or a double clutch gear mechanism with two part gear mechanisms. Instead of the clutch arrangement and gear mechanism, the drive train 10 can also have a converter automatic gear mechanism.

An output from the gear mechanism 16 is connected to the differential 18 which distributes the drive power to the two driven wheels 20L, 20R of the drive train.

The gear mechanism 16 in the present case has a first shaft 22 and a second shaft 24. FIG. 1 shows diagrammatically a cog set 26 which has a fixed cog (wheel) 28 firmly connected to the second shaft 24, and a releasable cog 29 engaging therewith and mounted rotatably on the first shaft 22. It is evident that the cog set 26 can be associated for example with a gear of the gear mechanism, and that the gear mechanism 16 can contain a plurality of such cog sets.

In the present case, the gear allocated to the cog set 26 is a gear which for example is arranged in an automatic gear mechanism between the D position and a P position of a gear selector lever, i.e. for example a reverse gear.

The gear mechanism 16 furthermore has a gear shift arrangement 30. The gear shift arrangement 30 contains a clutch packet 32 which has a first clutch 34. The first clutch 34 serves to decouple the releasable cog 29 from the first shaft 22 or connect this therewith rotationally fixedly. The first clutch 34 can for example be a synchronous clutch of conventional construction.

The clutch packet 32 has a selector sleeve 36 by means of which the first clutch 34 can be activated, as indicated by an arrow in FIG. 1.

The clutch packet 32 can in some cases have a second clutch, as indicated diagrammatically with 38.

The gear shift arrangement 30 furthermore has an actuator arrangement 40. The actuator arrangement 40 contains an actuator 42 which can for example be a hydraulic or an electromechanical actuator. The actuator 42 has an actuator element 44 which can be moved by means of the actuator 42 between several positions, for example a starting position A indicated in FIG. 1 (which can be a neutral position or a gear position), a gear position G associated with the gear formed by the cog set 26, and a parking block position P.

The actuator element 44 is coupled with the clutch, in particular with the selector sleeve 36, via a first force transmission device 46.

The actuator arrangement 40 has an associated control device 48 which controls the actuator arrangement 40 such that the actuator element 44 can be moved between the different positions. In a preferred embodiment, the actuator arrangement 40 contains an electric motor and the actuator element 44 is formed by a drum controller which is driven by means of an electric motor.

The gear shift arrangement 30 furthermore contains a parking block arrangement 50. The parking block arrangement 50 can, in the known manner, have a parking block cog 52 which for example is rigidly connected with an output shaft of a gear mechanism 16, and a parking block pawl 54 which can pivot around an axis in order either to release the parking block cog or to fix this in relation to a housing (not shown) of the gear mechanism. When the parking block arrangement 50 is in the parking block position, the motor vehicle equipped with the present drive train is consequently immobilised.

The parking block arrangement 50 can be constructed for example as a parking block arrangement described in the document DE 20 2008 001 760 U1 cited initially, wherein reference is made to the full disclosure content thereof in the present case.

The parking block arrangement 50 is coupled with the actuator arrangement 40, or more precisely the actuator element 44, via a second force transmission device 56. Consequently, only a single actuator is required to activate the parking block arrangement 50 and to activate the clutch 34.

The parking block arrangement 50 is normally activated when the vehicle has stopped. When the vehicle has stopped, it can occur that engagement of a gear is not possible, since for example toothings of a selector sleeve and a clutch body of the releasable cog cannot intermesh axially. In the present case it is generally furthermore provided that the parking block position of the actuator element 44 is usually approached by "passing through" the gear position G, so that the associated gear is either temporarily engaged and disengaged, or remains engaged in the parking block position P.

In order then to be able to approach the parking block position by means of the actuator element 44 even when the first clutch 34 is blocked, the first force transmission device 46 has a decoupling device 58. The decoupling device is configured such that the actuator arrangement can be moved into the parking block position P even when the clutch 34 is blocked.

The decoupling device 58 can here have an electromagnetic clutch or a clutch which can be activated in another manner. It is particularly preferred however if the decoupling device 58 has a mechanical energy accumulator which is configured to store a force applied by the actuator arrangement 40 for engaging the gear if the first clutch 34 is blocked.

Figure 1A:
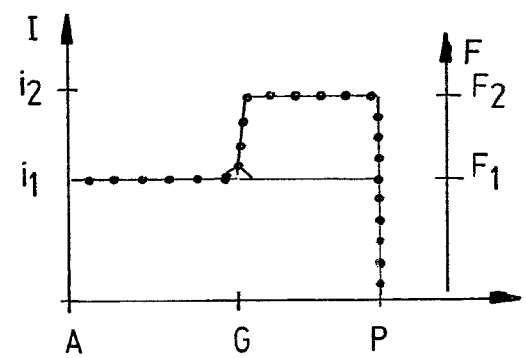
FIG. 1a is a diagram of current and force over a travel of an actuator element of an actuator arrangement of a gear shift arrangement according to the invention.

FIG. 1a shows a diagram of a electric current I and an associated force F over the travel of the actuator element 44.

In order to move the actuator element 44 from the starting position A into the parking block position P, normally an electric current $i_1$ is required which leads to a specific force $F_1$ exerted by the actuator arrangement. If the first clutch 34 is not blocked during the travel from the starting position A to the parking block position P, this current is sufficient to reach the parking block position P. This is shown by the solid line in FIG. 1a.

If the first clutch is blocked, the actuator arrangement 40 will remain stopped so that the parking block position P cannot be reached. If such a blockade is detected, the electric current can be increased, namely for example to a value $i_2$ which corresponds to a force $F_2$. Force $F_2$ is greater than force $F_1$. The difference between force $F_2$ and force $F_1$ is sufficient to activate the decoupling device, i.e. for example to deflect a mechanical spring which is associated with the decoupling device 58.

On detection of the blockade, then the electric current is increased and consequently a higher force is applied in order thus to activate the decoupling device 58 and be able safely to engage the parking block position P even when the first clutch 34 is blocked.

The electric current can for example be an electric motor current for driving a drum controller, but can also be a current from a pump for activating a hydraulic actuator or similar.

Figure 2:
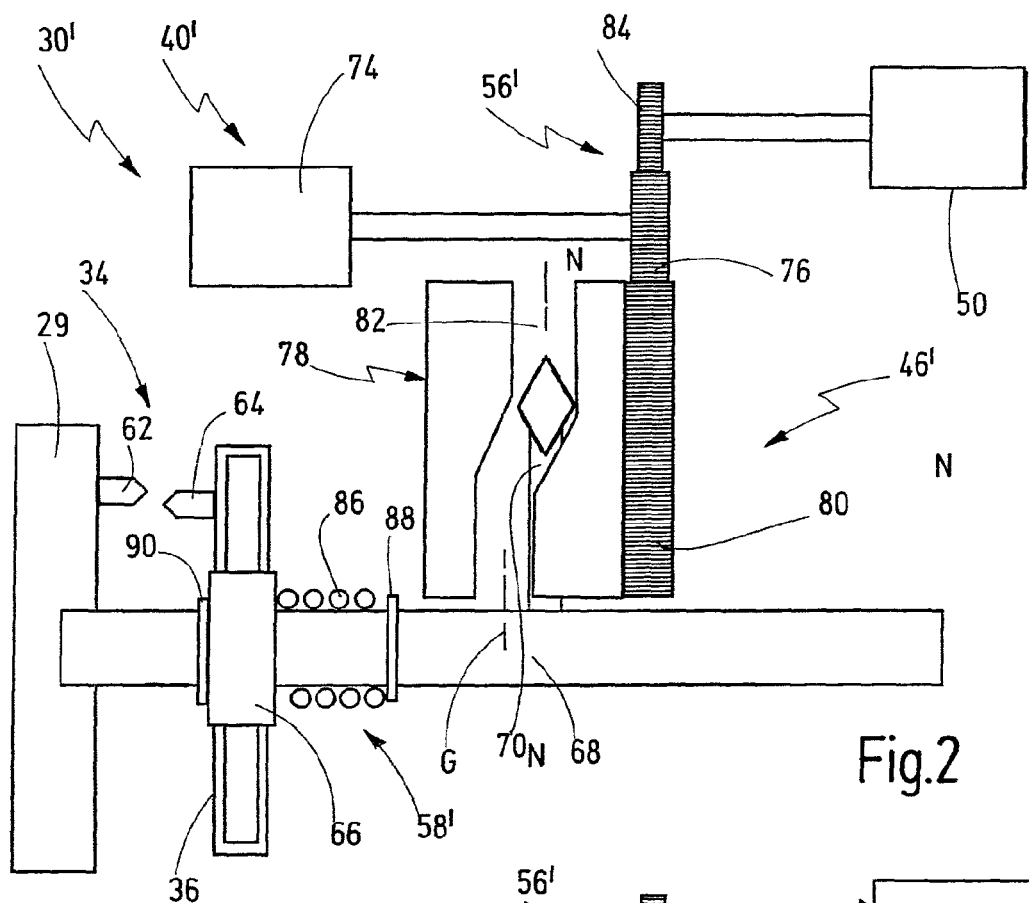
FIG. 2 is a diagrammatic depiction of an embodiment of a gear shift arrangement according to the invention in a neutral position.
Figure 3:
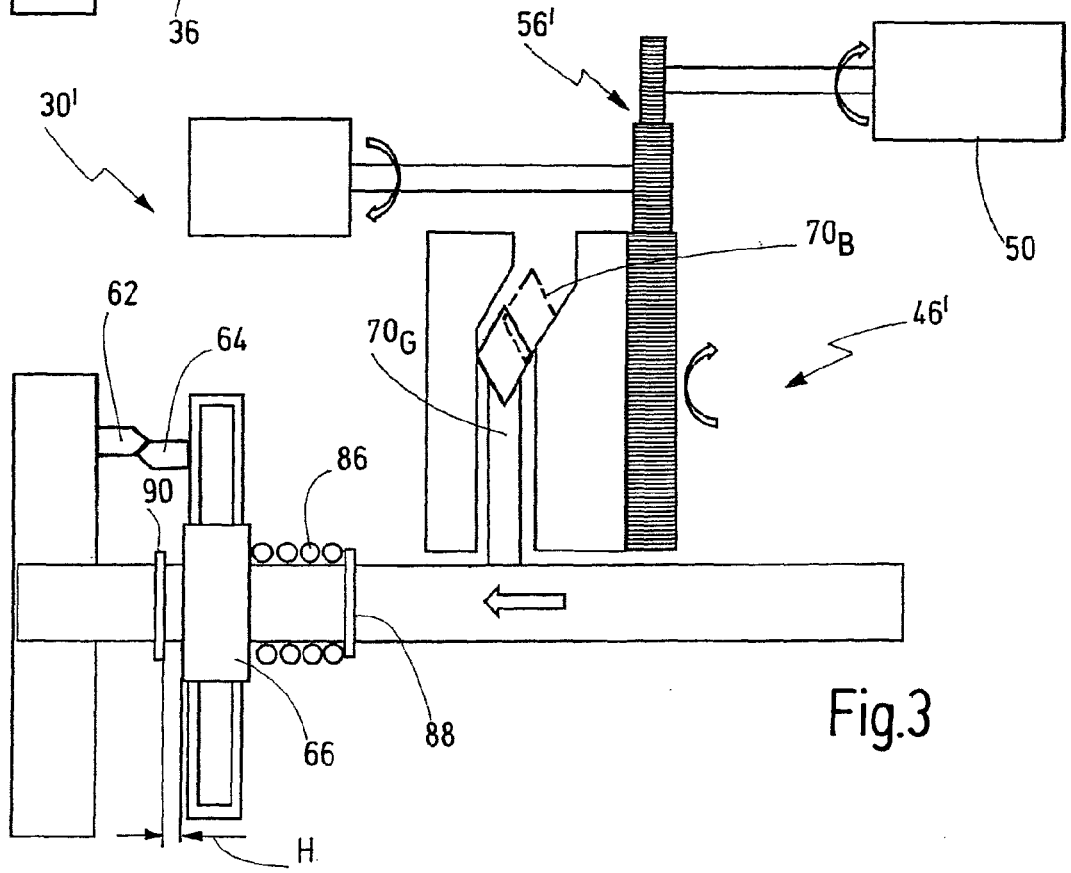
FIG. 3 is the gear shift arrangement from FIG. 2 in a parking block position with blocked clutch.

FIGS. 2 and 3 show a further embodiment of a gear shift arrangement 30' which generally corresponds in construction and function to the gear shift arrangement 30 in FIG. 1. The same elements therefore carry the same reference numerals. Substantially only the differences are explained below.

FIG. 2 shows that the releasable cog 29 can be associated with a clutch body toothing 62 of a clutch body which is connected rigidly to the releasable cog 29. Furthermore the selector sleeve 36 has a selector sleeve toothing 64. The selector sleeve 36 in the present case is activated by means of a selector element such as a selector fork 66. FIG. 1 shows the first clutch 34 in a neutral position in which the releasable cog 29 is decoupled from the associated shaft 24. By moving the selector sleeve 36 to the left in FIG. 2, the toothings 62, 64 can intermesh axially in order thus to create a form-fit connection between the releasable cog 29 and the associated shaft 24.

The selector element 66 is mounted axially moveably within limits on a selector rod 68. A selector rod carrier 70 is fixed on the selector rod 68, and on this for example a sliding pad (diamond-shaped in FIG. 2) can be fixed.

The actuator arrangement 40' of the gear shift arrangement 30' in FIGS. 2 and 3 has an electric motor 74, the motor shaft of which is rigidly connected to a motor gear wheel 76. Furthermore the actuator arrangement 40' has a drum controller 78 which constitutes an actuator element. The drum controller 78 is rigidly connected to a drum controller gear wheel 80 which is in engagement with the motor gear wheel 76. The drum controller 78 has a drum controller contour 82 in which the selector rod carrier 70 engages. By twisting the drum controller 78 by means of the electric motor 74, the selector rod carrier 70 can then be moved axially, via the drum controller contour 82, from the neutral position shown in FIG. 2 into a gear position G in order to activate the first clutch 34. By turning the drum controller 78 in the opposite direction, the selector rod carrier 70 can be drawn back in the opposite direction (i.e. into the neutral position).

The parking block arrangement 50 has an input shaft which is rigidly connected to a parking block gear wheel 84. The parking block gear wheel 84 is in engagement with a motor gear wheel 76 (or with the drum controller gear wheel 80).

By twisting the motor gear wheel 76, the parking block arrangement 50 can then be activated via the parking block gear wheel 84. The coupling between the motor gear wheel 76 and the parking block gear wheel 84 forms a second force transmission device 56'. The second force transmission device 56' in the present case is thus preferably formed by a constrained motion gear mechanism.

A decoupling device 58' is arranged between the selector rod 68 and the selector element 66. The decoupling device 58' has a spring 86 which is arranged coaxially around the selector rod 68 as a compression spring. At one end, the spring 86 rests on a selector rod shoulder 88. At the other end, the spring 86 rests on the selector element 66. To establish a base position, furthermore a stop 90 is provided on the selector rod 68, against which stop the selector element 66 is pressed by means of the spring 86.

The pretension force of the spring 86 can be greater than the mean shift force, such that the spring 86 is not deflected in normal shift processes. The pretension force of the spring 86 can however also be less than the mean shift force. In this case the spring 86 is regularly deflected even on normal shift processes, wherein this can prevent scraping of the first clutch 34.

The spring 86 of the decoupling device 58' however primarily serves to allow engagement of the parking block position P even when the first clutch 34 is blocked. This is explained below with reference to FIG. 3. When the electric motor 74 is driven to engage the parking block position (shown by corresponding arrows), the selector rod carrier 70 is moved in the axial direction by means of the drum controller contour 82. If the toothings 62, 64 are misaligned so that the first clutch 34 is blocked, in a conventional gear shift arrangement the drum controller 78 would remain in a position in which the selector rod carrier 70 had reached a position $70_B$ shown in dotted lines in FIG. 3. By the provision of the decoupling device 58' however, the drum controller 78 can continue to rotate to establish the parking block position P, up to the position $70_G$ shown in FIG. 3. Here the spring 86 is deflected namely by a distance H. The distance H can for example lie in the range from 1 to 10 mm, preferably in the range from 2 to 6 mm, in particular in the range from 3 to 5 mm.

In the resulting parking block position P, when the blockade of the first clutch 34 is released, the force of spring 86 may be sufficient to engage the associated gear, i.e. to bring distance H back to 0 or almost 0, without the drum controller 78 needing to be moved for this.

FIGS. 4 to 9 show further embodiments of first force transmission devices, which each have decoupling devices and generally correspond in construction and function to the first force transmission device 46' of FIGS. 2 and 3. The same elements therefore carry the same reference numerals. Substantially only the differences are explained below.

Figure 4:
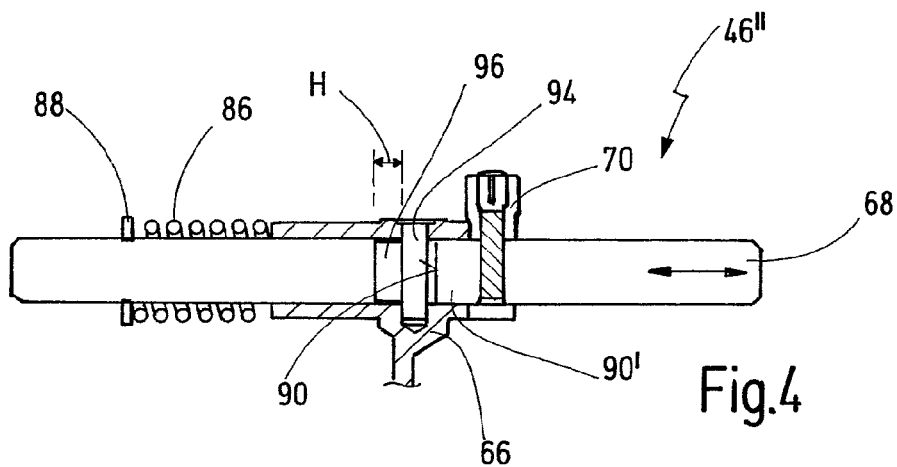
FIG. 4 is an embodiment of a first force transmission device for a gear shift arrangement according to the invention.

In the first force transmission device 46" of FIG. 4, the selector element 66 is coupled with the selector rod 68 via a selector element pin 94. The selector element pin 94 passes through the selector rod 68.

To establish the distance H, a radial hole is formed in the selector rod 68 as an axial slot 96 such that the selector element 66 is moveable within limits in relation to the selector rod 68. In other words a stop 90 can be formed on an inner wall of the slot 96.

The spring 86 is arranged between a selector rod shoulder 88 and the selector element 66.

The selector rod carrier 70 is rigidly connected with the selector rod 68, and the selector element 66 lies on the selector rod carrier 70. In this case the stop for the selector element 66 can also be formed by the selector rod carrier 70, as indicated with 90' in FIG. 4.

FIGS. 5 to 8 show further embodiments of first force transmission devices 46 which generally correspond in construction and function to the first force transmission device 46" of FIG. 4. The same elements therefore carry the same reference numerals. Substantially only the differences are explained below.

Figure 5:
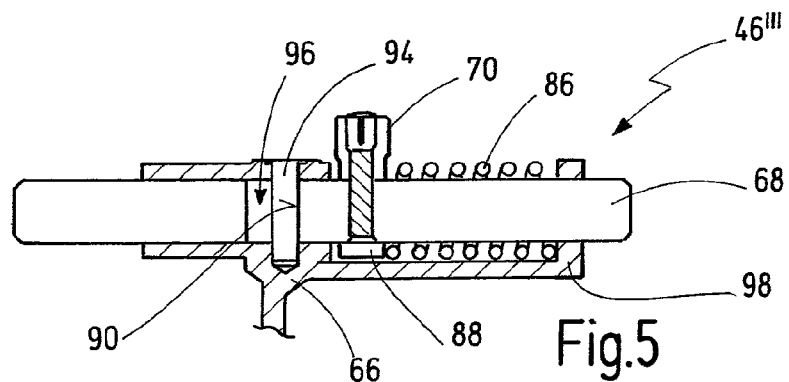
FIG. 5 is a further embodiment of a first force transmission device.

In the first force transmission device 46''' of FIG. 5, the spring 86 and the selector rod carrier 70 are arranged on an axial side of the selector element 66, so as to give a space-saving arrangement. The selector element 66 has a selector element shoulder 98 on which the spring 86 rests. On the other axial side, the spring 86 rests on the selector rod carrier 70.

Figure 6:
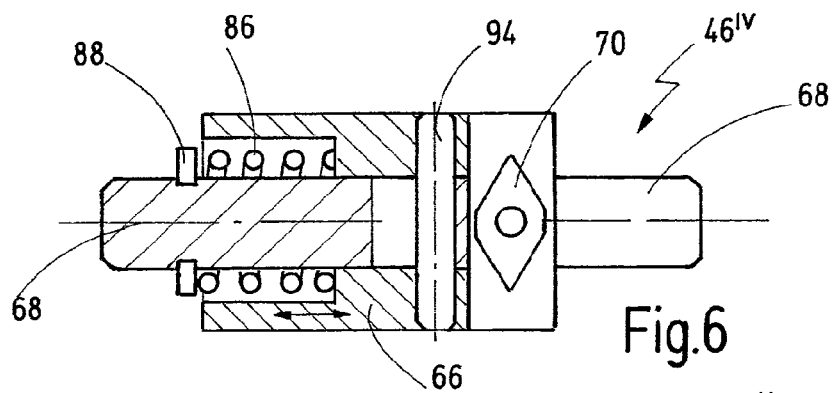
FIG. 6 is a further embodiment of a first force transmission device.

In the first force transmission device $46^{IV}$ of FIG. 6, in comparison with the force transmission device 46" of FIG. 4, it is provided that the selector element 66 has an axial cavity in which the spring 86 is arranged, in order to protect this from external influences.

Figure 7:
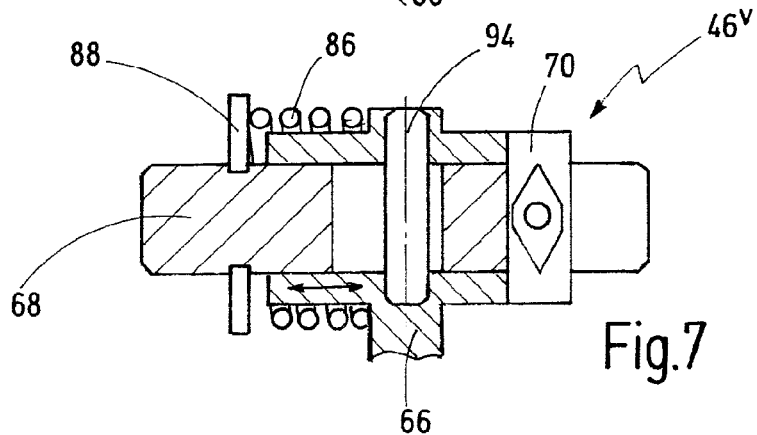
FIG. 7 is a further embodiment of a first force transmission device.

In the first force transmission device $46^{V}$ of FIG. 7, the selector element 66 has a spring guide portion around which the spring 86 is arranged, so that the spring 86 does not rest on an axial end of the selector element 66 as shown in FIG. 4, but on a shoulder of the selector element 66 which can be formed in the region of the connection of the selector element with the selector element pin.

Figure 8:
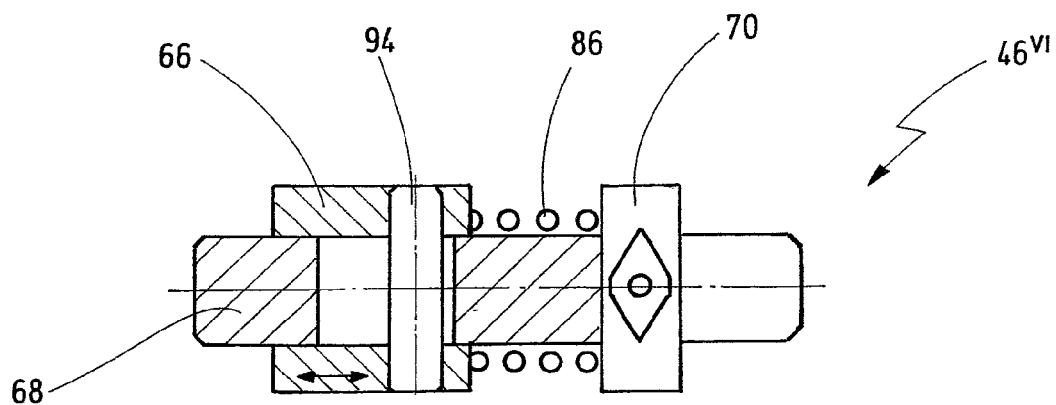
FIG. 8 is a further embodiment of a first force transmission device.

In the first force transmission device 46$^{VI}$ shown in FIG. 8, as in the embodiment of FIG. 5, the spring 86 and the selector rod carrier 70 are arranged on an axial side of the selector element 66. In this case the spring 86 is however clamped between an axial end of the selector element 66 and the selector rod carrier 70.

Figure 9:
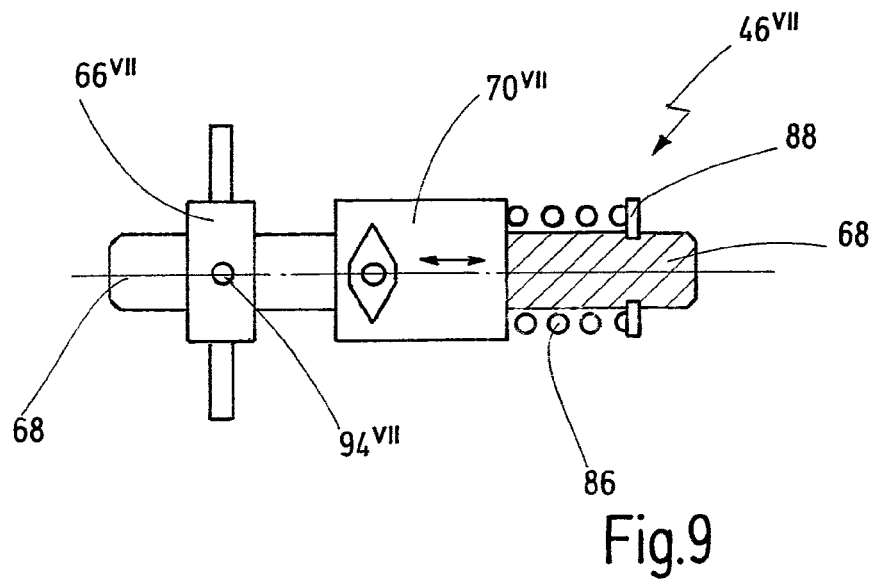
FIG. 9 is a further embodiment of a first force transmission device.

FIG. 9 shows a derivation of the first force transmission devices described above in the form of a first force transmission device 46$^{VII}$.

In the first force transmission device 46$^{VII}$, the selector element 66$^{VII}$ is rigidly connected with the selector rod 68, in this case via a selector element pin 94$^{VII}$ which passes through a bore provided concentrically thereto in the selector rod 68.

In the embodiment in FIG. 9, the selector rod carrier 70$^{VII}$ is mounted moveably within limits in the axial direction on the selector rod 68, and the spring 86 is clamped between a selector rod shoulder 88 and the selector rod carrier 70$^{VII}$.

The invention claimed is:

1. Gear shift arrangement for a motor vehicle gear mechanism, with:
    at least one clutch arrangement by means of which a gear of the mechanism can be engaged and disengaged,
    an actuator arrangement which is coupled with the clutch arrangement via a first force transmission device,
    a parking block arrangement which is coupled with the actuator arrangement via a second force transmission device,
    wherein the actuator arrangement can be moved into a parking block position in which the parking block arrangement is activated, wherein the actuator arrangement is configured to engage the gear at least one of on its travel to the parking block position and in the parking block position via the first force transmission device,
    the first force transmission device has a decoupling device which is configured to move or to let move the actuator arrangement into the parking block position even when the clutch arrangement is blocked,
    the decoupling device has a mechanical energy accumulator which is configured to store a force applied by the actuator arrangement for engaging the gear if the clutch arrangement is blocked, and
    the energy accumulator creates a pretension force between the actuator arrangement and the clutch arrangement which is greater than the mean shift force to be applied for engaging the gear.

2. Gear shift arrangement according to claim 1, wherein the mechanical energy accumulator has a spring.

3. Gear shift arrangement according to claim 1, wherein the decoupling device is arranged between an actuator element of the actuator arrangement and a selector element of the clutch arrangement.

4. Gear shift arrangement according to claim 3, wherein the decoupling device is arranged between the selector element and a selector rod which is connected by form fit with the actuator element.

5. Gear shift arrangement according to claim 1, wherein the clutch arrangement has a selector element and a selector rod, wherein the selector element is mounted moveably within limits on the selector rod.

6. Gear shift arrangement according to claim 5, wherein the selector element is coupled with the selector rod via the mechanical energy accumulator.

7. Gear shift arrangement according to claim 1, wherein the actuator arrangement has a drum controller.

8. Gear shift arrangement according to claim 7, wherein a carrier element of the first force transmission device engages in a switch contour of the drum controller, and/or the parking block arrangement is coupled with the drum controller via a constrained motion gear mechanism.

9. Gear shift arrangement for a motor vehicle gear mechanism, with:
    at least one shift clutch arrangement by means of which a gear of the gear mechanism can be engaged and disengaged,
    an actuator arrangement which is coupled with the shift clutch arrangement via a first force transmission device,
    a parking block arrangement which is coupled with the actuator arrangement via a second force transmission device,
    wherein the actuator arrangement can be moved into a parking block position in which the parking block arrangement is activated, wherein the actuator arrangement is configured to engage the gear at least one of on its travel to the parking block position and in the parking block position via the first force transmission device, and
    the first force transmission device has a decoupling device which is configured to move or to let move the actuator arrangement into the parking block position even when the shift clutch arrangement is blocked.

10. Gear shift arrangement according to claim 9, wherein the decoupling device has a mechanical energy accumulator which is configured to store a force applied by the actuator arrangement for engaging the gear if the clutch arrangement is blocked.

11. Gear shift arrangement according to claim 9, wherein the decoupling device has a spring.

12. Gear shift arrangement according to claim 9, wherein the decoupling device is arranged between an actuator element of the actuator arrangement and a selector element of the clutch arrangement.

13. Gear shift arrangement according to claim 12, wherein the decoupling device is arranged between the selector element and a selector rod which is connected by form fit with the actuator element.

14. Gear shift arrangement according to claim 9, wherein the clutch arrangement has a selector element and a selector rod, wherein the selector element is mounted moveably within limits on the selector rod.

15. Gear shift arrangement according to claim 14, wherein the selector element is coupled with the selector rod via a spring.

16. Gear shift arrangement according to claim 9, wherein the actuator arrangement has a drum controller.

17. Gear shift arrangement according to claim 16, wherein a carrier element of the first force transmission device engages in a switch contour of the drum controller and/or the parking block arrangement is coupled with the drum controller via a constrained motion gear mechanism.

18. Method for activating a parking block arrangement by means of an actuator arrangement, wherein the actuator arrangement is coupled with a clutch arrangement of a motor vehicle gear mechanism via a first force transmission device, wherein the actuator arrangement is coupled with the parking block arrangement via a second force transmission device, and wherein the first force transmission device has a decoupling device, with the steps:

controlling the actuator arrangement such that a first force is provided for moving the parking block arrangement into a parking block position;

detecting whether a blockade occurs on the travel into the parking block position;

controlling the actuator arrangement such that a second force is provided which is greater than the first force and by means of which the decoupling device of the first force transmission device is activated if a blockade has occurred.

* * * * *